Feb. 10, 1970  A. I. STIEBEL ET AL  3,494,036
DIGITAL FOOT MEASURING INSTRUMENT
Filed Nov. 13, 1967  4 Sheets-Sheet 1
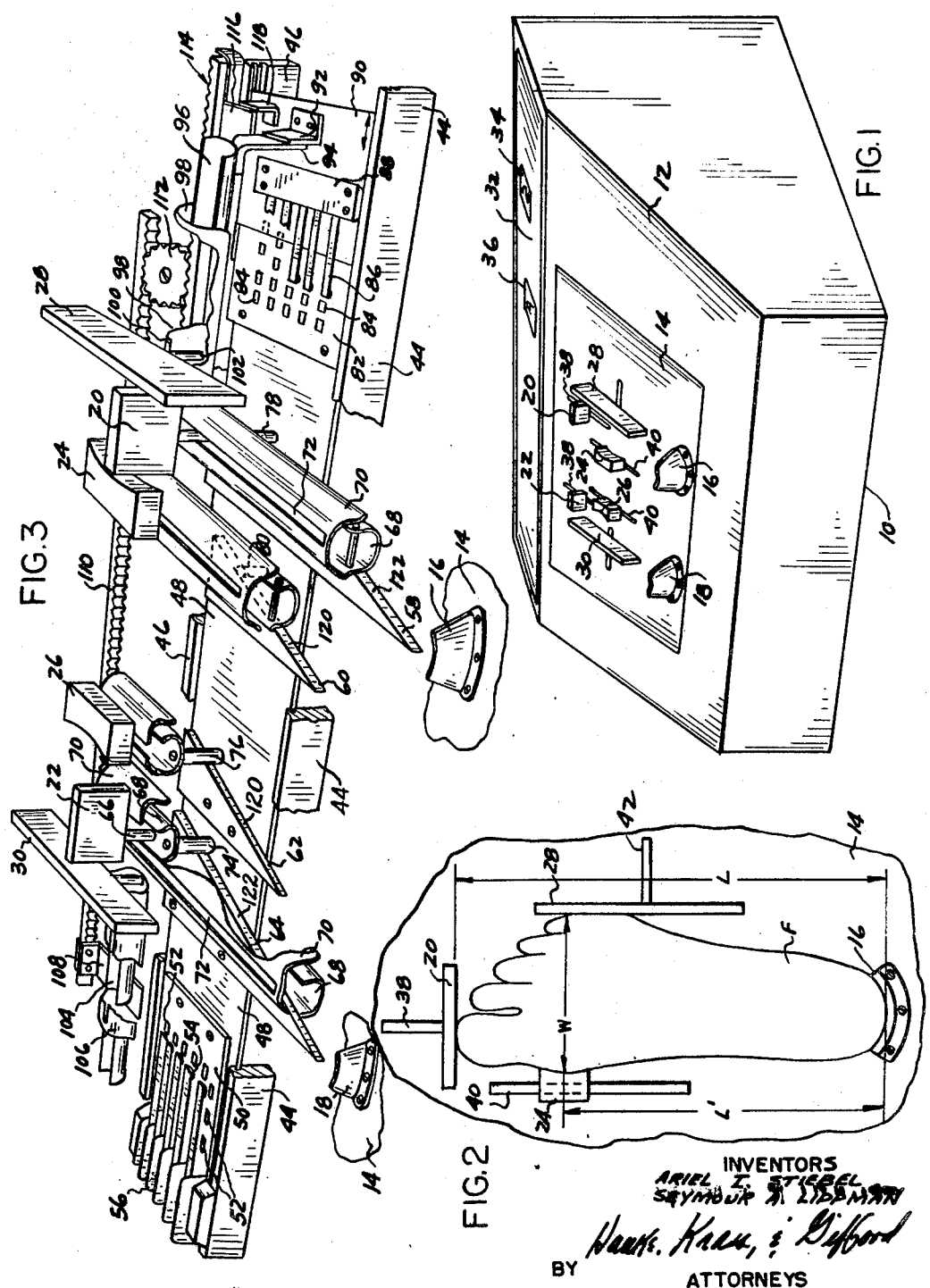
INVENTORS
ARIEL I. STIEBEL
SEYMOUR A. LIPPMAN
BY
ATTORNEYS Feb. 10, 1970   A. I. STIEBEL ET AL   3,494,036
DIGITAL FOOT MEASURING INSTRUMENT
Filed Nov. 13, 1967   4 Sheets-Sheet 2
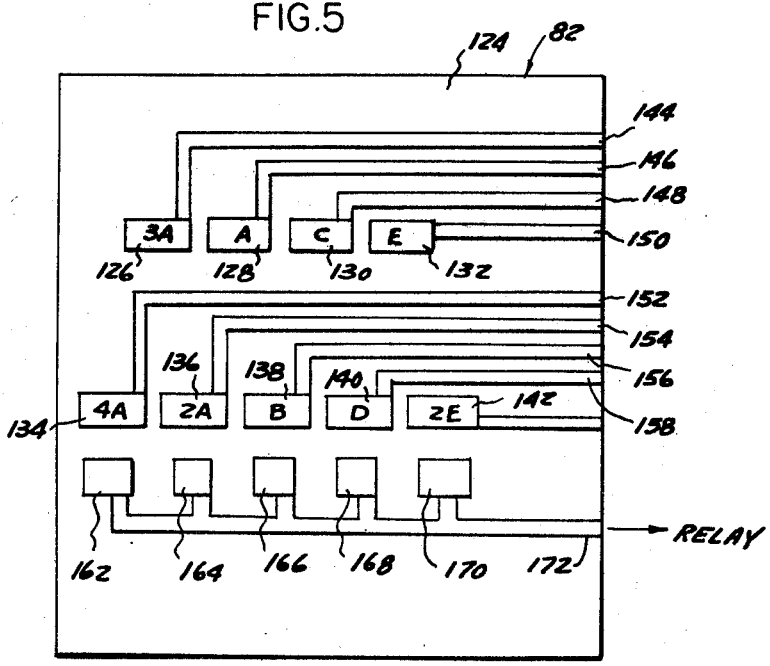
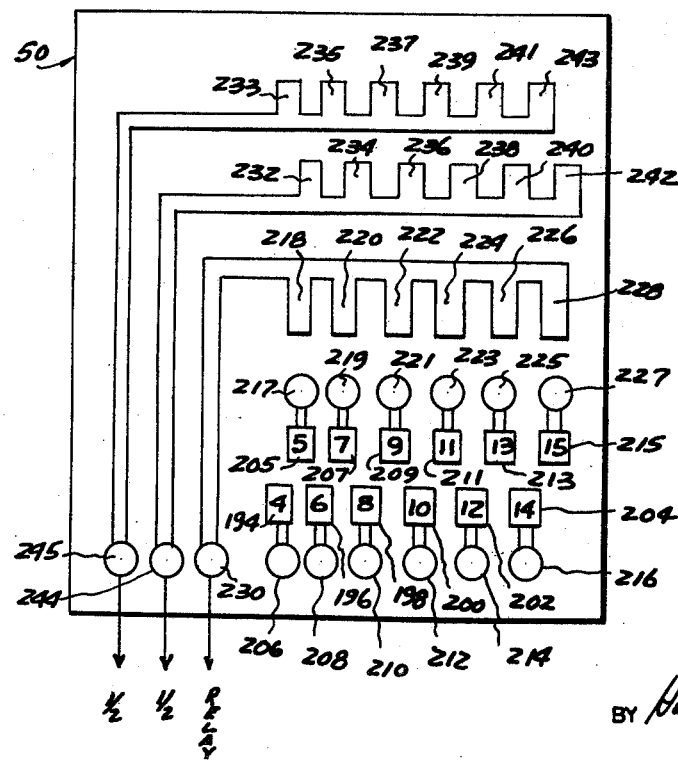
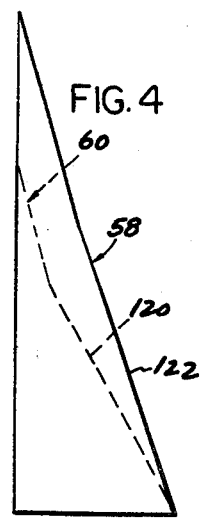
INVENTORS
ARIEL I. STIEBEL
SEYMOUR A. LIPPMAN
BY Hanks, Keen, & Gifford
ATTORNEYS

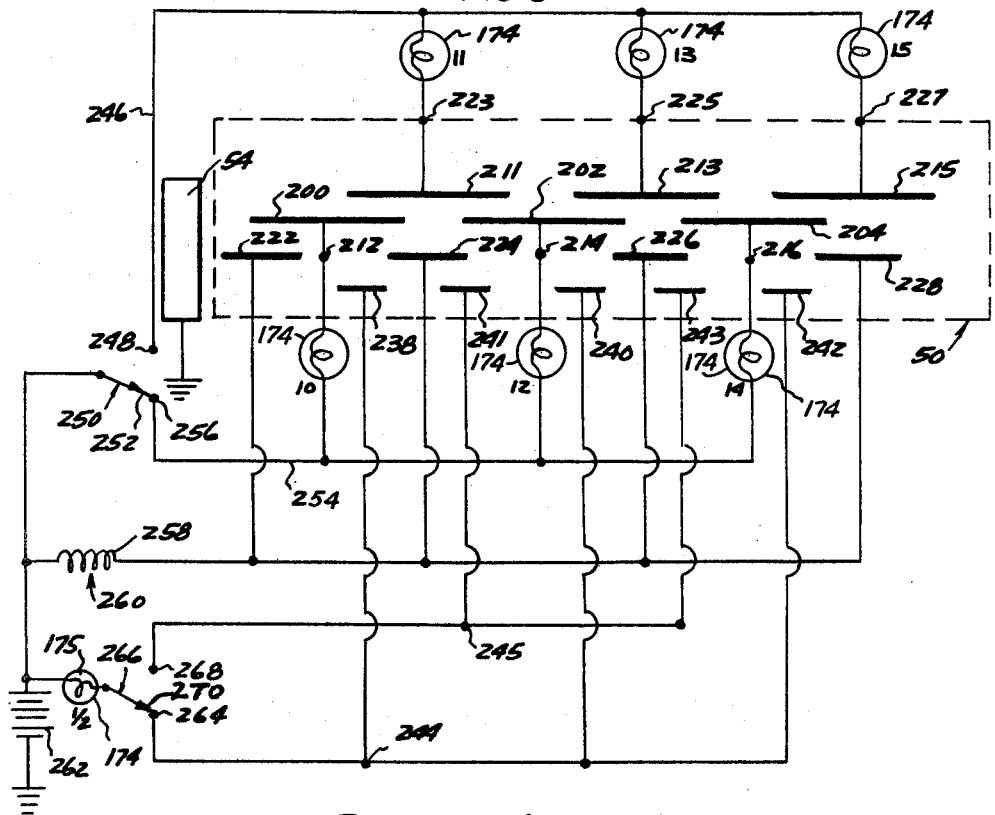
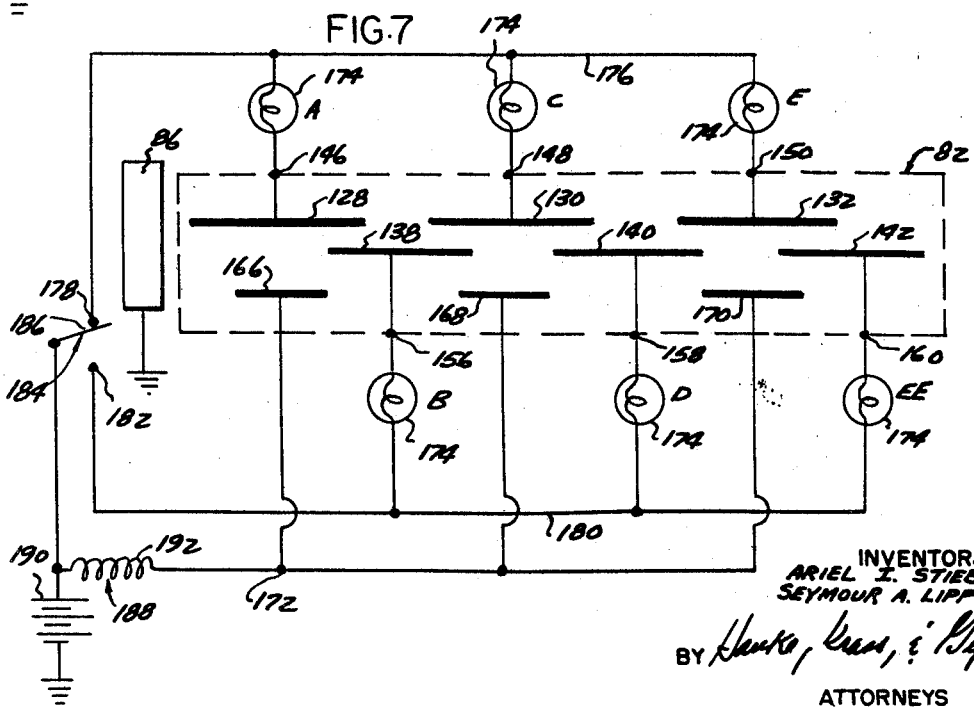

Feb. 10, 1970  A. I. STIEBEL ET AL  3,494,036
DIGITAL FOOT MEASURING INSTRUMENT

Filed Nov. 13, 1967  4 Sheets-Sheet 4

INVENTORS
ARIEL I. STIEBEL
SEYMOUR A. LIPPMAN

BY Hauke, Knaus, & Gifford
ATTORNEYS

United States Patent Office 3,494,036
Patented Feb. 10, 1970

3,494,036
DIGITAL FOOT MEASURING INSTRUMENT
Ariel I. Stiebel and Seymour A. Lippmann, Detroit, Mich., assignors to Radex Corporation, Detroit, Mich., a corporation of Michigan
Filed Nov. 13, 1967, Ser. No. 687,086
Int. Cl. A43d 1/00
U.S. Cl. 33—3                                    9 Claims

ABSTRACT OF THE DISCLOSURE

An apparatus for measuring and visually displaying the shoe size corresponding to the length and width of a human foot, and comprising a first movable member engageable with the toe end of a foot, a second movable member engageable with the ball of the foot and a third movable member engageable with the side of the foot, a first circuit establishing slide operatively connected to the first and second movable members and a second circuit establishing slide operatively connected to the third member. According to the circuits closed respectively by the first and second slides, a digital numerical display of an appropriate shoe length and width size is operated. The first and the second movable members are operatively connected to the first slide in such manner that the indicated length shoe size is dependent upon the overriding action of either the overall length foot measurement or arch length measurement. A left foot measurement device and a right foot measurement device are preferably interconnected such that the shoe size displayed is the shoe size of the larger of the two feet of a human.

---

The present invention relates to foot measuring instruments in general, and more particularly to a foot measuring instrument providing a digital display of the foot size of the larger one of the two feet of a person, for the purpose of fitting shoes.

Prior art foot measuring devices for the purpose of finding foot size preparatory to the fitting of shoes generally consist of manually operated gaging apparatus including a slide utilized to measure the overall length of the foot and another slide utilized to measure the width of the foot. The accuracy of any such devices leaves much to be desired, and the operation thereof requires a certain amount of skill and training on the part of the user, in order to interpret correctly the measurements indicated by the device as well as for adequate manipulation of the slides.

Other prior art foot measuring devices have attempted to overcome some of the disadvantages of hand-operated foot sizing gages by providing an apparatus giving a visual display of the length and width of each foot. Such apparatus often requires lengthy manipulation of diverse controls in order to obtain proper results, and they generally indicate the size of each individual foot, therefore making it necessary for a shoe fitter to interpret the results and adopt as the proper size the size of the larger foot.

Through the use of a foot measuring device according to the present invention, the length, width and arch length of the foot of a person are accurately and interrelatedly determined and visually displayed in a digital manner to enable a shoe fitter and the purchaser of footwear to visually observe the size clearly indicated. As the proper shoe size corresponds to the size of the larger foot of a person, and as most persons have a foot which is larger than the other, foot measuring devices according to the present invention provide for only the size of the larger foot to be visually displayed.

It is therefore a primary object of the invention to provide a foot measuring device giving a visual display of the correct shoe size of a person.

Another object of the invention is to provide a foot measuring device capable of integrating three simultaneous measurements of each foot and of providing a visual display of the correct size, in length and width, of the larger foot of a person.

Yet another object of the invention is to provide a foot size measuring device which in addition of being capable of integrating three simultaneous measurements of each foot of a person is capable of supplying a digital visual display of the larger length size and of the larger width size not necessarily of the same foot.

A further object of the invention is to provide a foot measuring device wherein foot length, width and arch length are electrically determined and indicated for ready observation by the luminous visual display, in full view of the customer as well as the shoe fitter.

Still another object of the invention is to provide a foot measuring device, wherein the length, arch length and width measurements of each foot are interrelated such that the width size is decreased proportionally to increases in overall length and arch length sizes according to the standard system of sizing footwear.

Still a further object of the present invention is to provide a foot measuring device wherein the overall length, arch length and width measurements of both feet are further interrelated in such a manner that the size visually displayed is the size of the larger foot of a person.

A further object of the invention is to provide a foot measuring and size display instrument having a minimum number of controls including means for programming the instrument to display the appropriate shoe size corresponding to the standard or scale used by a given shoe manufacturer.

Yet another object of the invention is to provide a foot measuring and size display device which is simple to manufacture, comprises a minimum number of parts, is virtually free from operative, mechanical and maintenance annoyances, which permits correct shoe fitting even by inexperienced personnel, considerably reduces the chances of mistakes and provides rapid evaluation of shoe sizes.

Other objects and advantages of the invention will appear from the following description of an example of a preferred form of the invention, when considered in conjunction with the drawings accompanying and forming part of the specification.

In the drawings:

FIG. 1 is a perspective view of an example of foot measuring instrument according to the invention;

FIG. 2 is a schematic plan representation of the sizing of a human foot according to the principles of the invention;

FIG. 3 is a simplified diagrammatic view, in perspective, illustrating the general arrangement of a preferred example of a foot measuring instrument according to the invention;

FIG. 4 is a plan view of two of the components of the foot measuring instrument of FIG. 3, shown superimposed;

FIG. 5 is a representation of an example of an electrical switching mechanism as used in a foot measuring instrument according to the invention;

FIG. 6 is another example of an electrical switching mechanism as used in a foot measuring instrument according to the invention;

FIG. 7 is a simplified electrical schematic of the operation of the switching mechanism of FIG. 5;

FIG. 8 is a simplified electrical diagram of the operation of the switching mechanism of FIG. 6.

Figure 9:
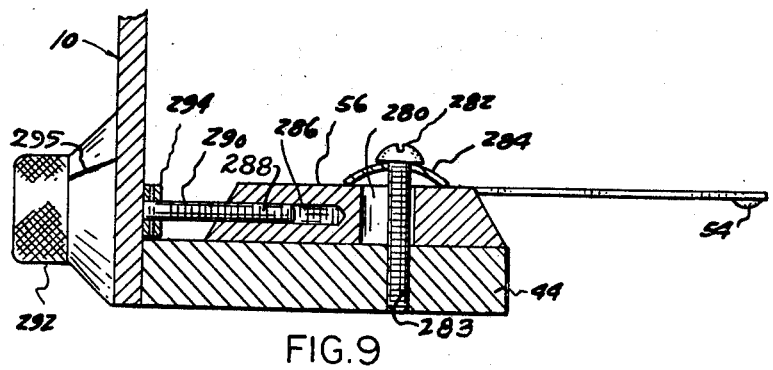
FIGS. 9 and 10 are examples of adjusting mechanisms adaptable to the example of foot measuring instrument according to the invention for rendering the same of universal use in spite of differences in shoe sizing standards between manufacturers.

Referring now to the drawings, and more particularly to FIG. 1 thereof, an example of a preferred embodiment of a foot measuring device according to the principles of the invention comprises a housing 10 having an upper surface 12 including a base 14 for foot measurement gaging elements arranged for adjustably engaging peripheral portions of human feet to be fitted with footwear. The measurement gaging assembly for each foot comprises a heel engaging plate, identified by numeral 16 with respect to the right foot and numeral 18 with respect to the left foot, which is held in a stationary position relatively to the base 14 by being affixed thereto by any convenient means such as screws. When a person is to be fitted for footwear, his feet are placed upon the base 14, with his right heel abutting against right heel engaging plate 16 and his left heel abutting against left heel engaging plate 18. Right and left big toe engaging slidable plates 20 and 22, which are longitudinally translatable relatively to the base 14, are disposed abutting respectively the right and left toes of the person. Longitudinally translatable right ball engaging plate 24 and left ball engaging plate 26 are positioned in abutment against respectively the balls of the right and left foot of the person. Right and left width determining plates 28 and 30 are placed in engagement with respectively the right side of the right foot and the left side of the left foot, and the visual display screen 32 displays two luminous indicia of respectively the length size 34 and the width size 36 of the larger one of the two feet of the person. The visual display of the appropriate shoe size is given in a digital manner indicating the proper size in length and width, as previously mentioned, of the larger foot of the person, by means of individual light bulbs, not shown in FIG. 1, and provided with appropriate indicia bearing transparent screens which become visible only when the appropriate light bulb is turned on.

As seen in FIGS. 1 and 2, the big toe engaging plates 20 and 22 are slidably translatable along a longitudinal slot 38 in base 14, the ball engaging plates are also slidable longitudinally along a slot 40, both slots 40 having their axes parallel to the longitudinal axes of slots 38. The width determining plates 28 and 30 are translatable along slots 42 in base 14, slot 42 of the right width determining plate being substantially aligned with slot 42 of the left width determining plate and the axis of slots 42 being at a right angle to the axes of slots 38 and 40.

As particularly shown in FIG. 2, the size of a foot such as right foot F is determined as to length by the distance L separating the heel engaging stationary plate 16 from the big toe engaging translatable plate 20. However, according to present standards shoes are sized in such a manner that the length size of the shoe also depends on the distance L' separating the most protruding portion of the ball of the foot from the heel, or expressed otherwise, the length size of a shoe is also dependent upon the arch length L'. Consequently, the foot measuring device of the invention, by means of the longitudinally translatable ball engaging plate, such as right foot ball engaging plate 24 of FIG. 2, is capable of determining the arch length L' of the foot F. The width W of foot F is determined by the distance separating the most protruding portion of the ball of the foot and a tangent to the curvature of the foot proximate the small toe. Consequently, the width W corresponds, as shown in FIG. 2, to the distance separating the innermost curved surface of the side of the ball engaging plate 24 from the width determining plate 28, translatable along slot 42 as previously mentioned. A foot measuring instrument according to the invention is capable of interpreting the three measurements L, L' and W which are interrelated in the standard shoe sizing system in general use in the United States, and provides for integration of the said measurements in such a manner that only the greatest effective measurements are preserved for visual display of the proper size, all the other measurments being rejected. Such an integration is accomplished by means of the mechanism illustrated in FIG. 3.

Referring now to FIG. 3 which shows a perspective view of the sizing and integrating mechanism according to the principles of the invention with some portions broken away for the sake of clarity and withmost of the base 14 removed, the housing of the apparatus fixedly supports two transversely disposed parallel rail members 44 and 46. Slidably disposed between rail members 44 and 46 is a slide member 48, on the left end of which, as seen in the drawing, is fixedly mounted a length determining electrical switching board 50. Length determining switching board 50 consists preferably of a printed board provided with a plurality of parallel disposed contacts 52 adapted to engage stationary spring wiper contacts 54 supported from a stationary terminal board 56. In other words, board 56 supporting stationary spring wiper contacts 54 is at all times maintained in position by being attached for example on the left hand ends of rail members 44 and 46 by any conventional means, not shown, while length determining electrical switching board 50 is caused to be displaced transversely by the motions of slide member 48 on which it is fixedly mounted.

Slide member 48 is constantly biased by means such as springs, not shown, toward the right, as seen in the drawing, and slide member 48 supports mounted thereon two pairs of substantially triangular members as shown at 58, 60, 62 and 64.

All the size determining movable plates, i.e. the big toe engaging plates 20 and 22, the ball engaging plates 24 and 26 and the width determining plates 28 and 30 are rigidly fastened to the slide portion of a linear slide bearing which may be any commercially available reliable ball, roller or plain bearing linear slide assembly. For example, with particular reference to left toe engaging plate 22, plate 22 is provided with a mounting pin 66 fastened to the slide 68 of a linear slide bearing having stationary member 70 provided with a slot 72 permitting longitudinal translation of the toe engaging plate mounting pin 66. Each stationary member 70 is affixed to the bottom of the apparatus base 14. Mounted ridigly upon the bottom of slide 68, thus longitudinally displaceable by toe engaging plate 22, is a rod 74 adapted to engage the hypothenuse side 122 of large right-angled triangular member 64. Similarly, the ball engaging plate 24 is capable of longitudinally displacing a rod 76 adapted to engage the hypothenuse side 120 of small right-angled triangular member 62. A similar configuration is provided for the right foot toe engaging plate 20 capable of displacing a rod 78 engageable with the hypothenuse side 122 of large right-angled triangular member 58, while right foot ball engaging plate 24, during its longitudinal displacement, displaces a rod 80 engaging the hypothenuse side 120 of smaller triangle 60. It is evident that an alternate arrangement could be provided with the triangular members 58, 60, 62 and 64 being connected to the appropriate toe engaging plate 20, ball engaging plates 24 and 26 and toe engaging plate 22, respectively, and being thereby translatable longitudinally, with the hypothenuse sides of the triangular members adapted to engage fixed pins attached to slide member 48.

On the right end, as seen in FIG. 3, of the slide member 48, is fixedly fastened a second electrical switching circuit board 82 which, as will be hereinafter explained in further detail, is adapted to provide width measurement electrical switching. Width measurement switching board 82 is preferably a printed circuit board provided with a plurality of aligned contacts 84 adapted to be engaged by flat spring wiper contacts 86 supported from a terminal board 88 fastened to a wiper contact plate 90. Wiper contact plate 90 is adapted to be laterally translatable relatively to fixed rail members 44 and 46. To that effect, the wiper contact plate 90 is provided with an angled abutment 92 rigidly mounted upon the board, the left face of angled abutment 92, as seen in the drawing, being engageable by a bar member 94 rigidly mounted upon the end of the slide 96 of a linear slide bearing assembly having a stationary member 98 mounted fixedly below the base 14, and provided with a slot 100 affording passage to the mounting pin 102 of the right width determining plate 28. Mounting pin 102 is affixed to the slide 96 of the linear bearing so that, upon translation of the width determining plate 28 toward the right, as seen in the drawing, bar member 94 engages the left side of angled abutment 92, thus displacing wiper contact plate 90 and wiper contacts 86 to the right, as seen in the drawing. Means, not shown, are provided for continuously biasing wiper contact plate 90 toward the left, as seen in the drawing.

The left width determining plate 30 is similarly adapted to displace the slide 104 of a linear slide bearing, having stationary member 106 attached, as all the other stationary members of all the other linear slide bearings, to the bottom surface of the base 14 (seen in FIGS. 1 and 2). As shown in FIG. 3, slide 104 carries rigidly attached thereto a connecting member, 108 rigidly supporting the end of a toothed rack 110. Toothed rack 110 extends practically the whole width of the apparatus and its other end engages a gear wheel 112, a short toothed rack 114 being disposed substantially parallel to the toothed rack 110 and having one end meshing with the teeth of the gear wheel 112 in a tangential manner at a position substantially geometrically diametrically opposed to the position at which the teeth of the gear wheel 112 tangentially meshes with the teeth of rack 110. The right hand end, as seen in the drawing, of short toothed rack 114 is provided with a rigidly mounted bar member 116 capable of engaging the left side of an angled abutment 118 rigidly mounted on movable wiper contact plate 90. In this manner, it can be seen that when left width determining plate 30 is moved toward the left, toothed rack 110 is also moved toward the left and short toothed rack 114 is moved toward the right in view of the differential action provided by gear wheel 112 meshing with both racks. Consequently, when left width determining plate 30 is moved to the left, bar member 116 is translated to the right, to a position which may cause it to engage angled abutment 118, thus displacing wiper contact plate 90 also to the right, as seen in the drawing, in the event that left foot width determining plate 30 is displaced to the left a distance greater than right foot determining plate 28 is displaced to the right, the apparatus being initially set up in such a way that when both width determining plates occupy symmetrical positions (i.e. when measuring feet of equal widths) both angled abutments 92 and 118 are engaged by bars 94 and 116 respectively.

FIG. 4 represents two right-angled triangular members such as member 58 and 60 of FIG. 3, in superimposed outlines with their small right-angled sides coinciding. It can be seen that triangular member 60 has a hypotenuse side 120 substantially, but not quite, on a straight line, and that triangular member 58 has a hypotenuse side 122 also substantially, but not quite, in a straight line, although more straight than the hypotenuse side 120 of triangular member 60. The lengths of the longer right-angled sides and the lengths and shapes of the hypotenuse sides of the triangular members are determined by the arbitrarily chosen progression of shoe sizes according to the shoe sizing standardization universally used in the United States, Canada and a few other countries. For other shoe sizing standardizations, such as are used in countries using the metric system, it is evident that the side lengths and shapes and the respective included angles of the triangular members may be somewhat slightly different from the pictorial representation of FIG. 4.

Referring back to FIG. 3, small triangular member 62 is similar and equal to small triangular member 60 and large triangular member 64 is similar and equal to large triangular member 58. As all four triangular members are rigidly fastened to slide member 48, with their smaller right-angled sides aligned and parallel to the axis of translation of the slide member, when both feet of a person are placed with the respective heels in abutting engagement with right and left heel engaging plates 16 and 18 of FIG. 1, the displacement of left and right toe engaging plates 20 and 22 cause respectively rod 78 and 74 to be displaced toward the top of the drawing as seen in FIG. 3, of a distance depending from the length of each individual foot, thus engaging the parallely disposed sides of respectively triangular member 58 and 64. It is immediately evident that the longer foot measurement overrides the shorter foot measurement and that the action of either rod 78 or rod 74 according to whether toe engaging plate 20 or toe engaging plate 22 is further displaced causes slide member 48 to be displaced more or less toward the left, as seen in the drawing, thus at the same time, displacing length switching board 50 more or less toward the left. Consequently, stationary spring contact wipers 54 supported by stationary board 56 are caused to engage any one of the appropriate contacts 52 disposed in substantially parallel rows on board 50.

The longitudinal displacements of right and left ball engaging plates 24 and 26 longitudinally displace rods 80 and 76 respectively. It can be seen that, if the heel to ball or arch length (such as L' of FIG. 2) is substantially proportionally short according to the standardized interrelation between toe-to-heel and arch lengths, rods 80 and 76 are prevented from engaging the hypothenuse side of either one of triangular member 60 or 62. However, if the arch length of any one of the feet being measured falls within a dimension L' which requires a higher shoe length size number according to the standardized interrelation between heel to toe length and arch length, the rod corresponding to the ball engaging plate longitudinally displaced furthest engages the hypothenuse side of the appropriate triangular member 64 or 62, thus causing further transverse displacement of slide member 48 toward the left, as seen in the drawing, consequently further displacing toward the left the length electrical switching board 50. The stationary contact wipers 54 are thus caused to engage different contacts 52 on the board 50, thus interconnecting the appropriate electrical circuits, as hereinafter explained in further detail for displaying the appropriate length size of the foot having the longest arch length. It can thus be seen that the length size displayed, such as at 34 in FIG. 1, is the length size of the over-riding foot having the proportionally longer arch length or heel to toe length, as the case may be according to the standard shoe sizing system, the longer length size over-ruling always the shorter length sizes. Consequently, the length size displayed is the proper length size for both shoes capable of fitting both feet.

Shoe length sizes are indicated in the United States by a number, and the width sizes are indicated by a letter, letter A arbitrarily representing the standardized "normal" width for any given length size. Consequently, because the width sizes are not absolute measurements but only relative measurements which are a function of the foot length sizes, the apparatus according tot he invention provides for a length-to-width correcting factor in a manner to be presently explained. Referring again to FIG. 3, when both right and left foot width determining plates 28 and 30 are displaced respectively so as to engage as shown in FIG. 2 with respect to a right foot F, with the outside curve of the foot proximate the little toe, the right and left ball engaging plates acting as a lateral stop preventing the feet from being displaced laterally, right width determining plate 28 displaces slide 96 which in turn displaces bar member 94 abutting against the left side of angled abutment 92. The lateral displacement of left width determining plate 30 to an appropriate position determines, by means of the link provided by slide 104, connecting member 108, geared rack 110, geared wheel 112 and geared rack 114, the position occupied by bar member 116.

Consequently the width size displayed by the apparatus is determined by which one of the width determining plates 28 or 30 is comparatively furthest displaced, with the result that the greatest width measurment over-rules the smallest width measurement. Because width circuit switching board 82 is rigidly mounted on the end of slide member 48 which, as previously mentioned, is caused to occupy a position resulting from the overriding action of whichever is the largest, be it right foot heel to toe length, right foot arch length, left foot heel to toe length, or left foot arch length, the position of width circuit switching board 82 is consequently dependent upon the overriding length measurement, and the position of the movable contact wiper plate board toward the right being dependent from the overriding foot width measurement, the resulting effect of the combined relative motion of width circuit switching board 82 bearing width size determining contacts 84 and of plate 90 supporting spring contact wipers 86 is to cause, by engagement with the appropriate contact 84, a visual display such as 36 of FIG. 1 of the appropriate width of the widest foot which is proper for the length size of the longest foot, be it with respect to its heel to toe length or with respect to its arch length.

Length circuit switching board 50 effectuates the appropriate connections between the appropriate contacts 52 cooperating with the stationary contact wipers 54 to establish the appropriate electrical circuit displaying a visual indication of the correct length size according to the simplified schematic of FIG. 8. The width circuit switching board 82 having contacts 84 cooperating with spring contact wipers 86 establishes the appropriate connections for providing a visual display of the shoe or foot width size indicia, by means of an electrical circuit according to the simplified diagram of FIG. 7.

Referring first to FIG. 5, width circuit switching board 82 comprises preferably a non-conductive board 124 made of material such as plastic, glass, or the like, provided with a first row of contacts designated 126-132 and a second parallel row of contacts designated 134-142. Contacts 126-132 are individually connected respectively to terminals 144-150, while contacts 134-142 are individually connected to terminals 152-160 respectively. In the example of board 82 shown in FIG. 5, contact 126 has been arbitrarily chosen to be the contact corresponding to width size AAA, 128 to width size A, contact 130 to width size C and contact 132 to width size E, while contact 134 has been arbitrarily chosen to correspond to width size AAAA, contact 136 to width size AA, contact 138 to width size B, contact 140 to width size D, and contact 142 to width size EE. It is to be noted, consequently, that consecutive size contacts are staggered from one contact row to the other and are overlapping. In addition, board 82 is provided with a third row of contacts 162-170 connected in parallel to common terminal 172. The position and dimensions of contacts 162, 166, and 168 are precisely determined relatively to the positions of the conacts in the two other rows for the reason that, as will be hereinafter explained, contacts 162-170 determine the operation of a relay permitting accurate switching from one visual display indicating a predetermined size to another visual display determining the next consecutive size, according to a very important aspect of the present invention. It is to be further noted that relay contact 162 and relay contact 170 are both longer than the other relay contacts although the distance separating either contact 162 or 170 from their contiguous contact is sbstantially the same as the distance separating all the other relay contacts 164-168.

The operation of width circuit switching board 82 can be explained with reference to the schematic diagram of FIG. 7 on which are shown only a few of the contacts for the purpose of simplification. Referring to FIG. 7, the width circuit switching board 82 is shown provided with width determining contacts disposed in two parallel rows, one contacts in one row being staggered relatively to the contact of the next row as previously mentioned. In FIG. 7 only contacts 128-132 of one row are shown, together with only contacts 138-142 in the second row. Also shown are contacts 166-170 of the relay contact row. Contact terminals 146-150 and 156-160 are connected to parallelly disposed light bulbs 174, the light bulb connected to terminal 146 being capable of displaying width size index A, the light bulb connected to terminal 148 being capable of displaying width size index C, etc. In this manner, contacts 128, 130 and 132 are connected through their appropriate light bulb 174 to a common bus line 176 having a terminal contact 178, and contacts 138-140 and 142 are connected through their appropriate light bulb to common line 180 having a terminal contact 182. Terminal contacts 178 and 182 are part of a switch 184 having a movable contact 186 actuable by a relay 188, movable contact 186 of switch 184 being connected to a terminal of a power supply 190, the other terminal of which is shown as being grounded. A relay 188 has a coil 192 having one end connected to the ungrounded terminal of the power supply 190 and its other end connected to common terminal 172 of relay contacts 166, 168 and 170. Stationary contact wiper 86 is shown connected to ground.

When board 82 is displaced, as previously mentioned as a result of the displacement of slide member 48 (FIG. 3) on which it is mounted, contact wiper 86 is caused to engage, for example, contact 128, FIG. 7. Assuming that, when contact wiper 86 engages contact 128 and relay contact 166 simultaneously, movable contact 186 of relay actuated switch 184 engages terminal contact 178, the ungrounded terminal of the power supply 190 is consequently connected to bus line 176 and bulb 174 displaying index A is turned on. When board 82 is further displaced toward the left, relay contact 166 is no longer engaged by contact wiper 86, and consequently, coil 192 of the relay 188 ceases from being activated, and movable contact 186 of relay actuated switch 184 is swung over in engagement with terminal contact 182. As a result, bus line 176 is no longer connected to the ungrounded terminal of power supply 190, and bulb 174 displaying index As is turned off. A contact wiper 86 is now engaging both overlapping contact 128 and contact 138, and as bus line 180 is now connected to the underground terminal of the power supply 190, bulb 174 capable of displaying index B is turned on and remains on during further displacement of board 82 toward the left until contact wiper 86 engages relay contact 168. When this happens, coil 192 of relay 188 is again activated, thus throwing movable contact 186 of relay actuated switch 184 in engagement with terminal contact 178, consequently bus line 180 is disconnected from the ungrounded terminal of the power supply and bus line 176 is connected thereto. At the time of the switch over, contact wiper 86 being engaged with both contact 138 and contact 130, the circuit to which contact 138 is connected is now open and the circuit to which contact 130 is connected is now closed as the result of the action of the relay, light bulb 174 displaying index C is turned off. The length of relay contact 170 is not as critical as the length of the other relay contacts, although the distance separating relay contact 170 from relay contact 168 is critical, because as soon as the relay is activated with contact wiper 86 engaging contact 142, the light bulb 174 displaying index 2E (or EE) remains on for any further travel toward the left of board 82. It is evident that the distance separating the relay contacts from each other as well as the length of the relay contacts themselves, being the determining factor in the relay switching over, must follow the progression of standardized shoe size width measurements.

Referring now to FIG. 6, there is shown a plan view of length circuit switching board 50 comprising a first row of contacts identified 194 to 204 and a second row of contacts identified 205 to 215. Contacts 194 through 204 which are the circuit establishing appropriate contacts for indicating even number length sizes 4, 6, 8, 10, 12 and 14 are individually and respectively provided with terminals 206 to 216. The second row of contacts 205 through 215, for establishing the appropriate connections to indicate odd number length sizes 5 to 15 are provided with individual terminals 217 to 227. The contacts in one row are staggered and overlapping with respect to the contacts in the other row.

There is also a series of relay contacts disposed in a row and identified by 218 to 228 and having a common terminal 230, and parallelly disposed staggered contacts 232 to 242 and 233 to 243 having common terminal 245, while contacts 232 to 242 are connected to a common terminal 244.

Referring now to FIG. 8, which shows only a portion of the contacts of each row on board 50, for the sake of simplification, it can be seen that the circuits established by the contacts of the row containing contacts 211, 213 and 215, and having respectively terminals 223, 225 and 227, are through individual parallel disposed light bulbs 174 adapted to display the appropriate length size digit 11, 13 or 15, when lit, connected by means of a common bus line 246 to a fixed contact 248 of a relay activated switch 250 having movable contact 252. The circuit establishing contacts, such as contacts 200, 202 and 204 of the second row are connected respectively through terminals 212, 214 and 216 to light bulbs 174 disposed in parallel and capable of displaying, when lit, digits 10, 12 and 14. These light bulbs 174 are connected in parallel to a common bus line 254 which is in turn connected to a fixed contact 256 of the relay actuated switch 250. Relay contacts 222, 224, 226 and 228 are connected in parallel to one end of coil 258 of a relay 260, the other end of coil 258 being connected in parallel with movable contact 252 of relay actuated switch 250 to the ungrounded terminal of a power supply 262. Contacts 238, 240 and 242 are connected through their common terminal 244 to fixed contact 264 of a relay actuated switch 266, while contacts 241 and 243 are connected through their common terminal 245 to the other fixed contact 268 of relay actuated switch 266. Movable contact 270 of relay actuated switch 266 is connected through a light bulb 175, capable of displaying digit ½ when lit, to the ungrounded terminal of the power supply 262.

As previously indicated herein relatively to FIG. 3, when slide member 48 is transversely displaced, board 50 is also displaced and contact wiper 54 is caused to engage the contacts disposed on the board. If contact wiper 54 is in the position indicated in FIG. 8, it is caused to engage contact 222 upon displacement to the left of board 50. The coil 258 of relay 260 is activated in view of the voltage of the power supply 262 being connected thereacross, and switch 250 is caused to occupy the position shown in the drawing, with its movable contact 252 engaging its fixed contact 256. Consequently, upon further displacement of the board 50 relatively to contact wiper 54, contact wiper 54 engages contact 200, and light bulb 174 connected across the power supply 262 thus turns on and displays the appropriate shoe length size corresponding to contact 200, which is the digit 10. Upon further displacement of board 50, contact wiper 54 is caused to engage simultaneously contact 200 and contact 238. The movable contact 270 of switch 266 being engaged with fixed contact 264, light bulb 175 is placed across the power supply and is lit, thus displaying digit ½ on the length size display of visual display of screen 32 of figure. The length size displayed is "10½."

Upon further relative displacement of board 50 and contact wiper 54, contact wiper 54 ceases to engage contact 238, consequently opening up the circuit of bulb 175, while engaging contact 224 and continuing to engage contacts 200 and 211. Engagement of contact wiper 54 with contact 224 places coil 258 of relay 260 across the power supply 262, thus actuating both switches 266 and 250. Movable contact 270 of switch 266 engages fixed contact 268, but, as contact wiper 54 does not yet engage contact 241, bulb 175 remains off. However, when relay 260 threw the movable contact 252 of relay actuated switch 250 in engagement with fixed contact 248, bus line 247 became disconnected from the ungrounded terminal of the power supply 262, and bus line 246 was connected to the ungrounded terminal of the power supply. Light bulb 174 displaying digit 11 and connected to contact 211 consequently turns on at the same time as light bulb 174 displaying digit 10 and connected to contact 200 is turned off, the visual display shown on screen 32 of FIG. 1 corresponding to the foot length size shown at 34 being now size 11. Upon further travel of the circuit board 50, contact wiper 54 is caused to engage simultaneously contacts 211, 224 and 241. As contact 241 is connected to terminal 245 connected in turn to fixed contact 268 of relay actuated switch 266 which has been already activated so that, as previously mentioned, movable contact 270 is engaging fixed contact 268, light bulb 175 is placed across the power supply 262, thus displaying digit ½. The length size displayed on the screen 32 of FIG. 1 thus corresponds to length size 11½.

Further travel to the left of circuit board 50 causes contact wiper 54 to become disengaged from contact 224 and subsequently from contact 241 while remaining engaged simultaneously with both contacts 211 and 202. Because in this position contact wiper 54 no longer engages relay contact 224, coil 258 of relay 260 is deenergized, and switch 266 is returned to the position indicated in the drawing while switch 250 is also caused to occupy the position indicated in the drawing with its movable contact 252 engaging its fixed contact 256. Thus bus line 247 is connected to the ungrounded terminal of the power supply 262 and the electrical circuit is completed through the light bulb 174 which displays digit 12, contact 202 and grounding contact wiper 54.

The operation described above causes the proper display of the overriding foot length size to become visible on the screen 32 of FIG. 1.

It can be seen that the arrangement just described provides for half sizes to be also displayed, while by way of the relay actuated switches the arrangement prevents simultaneous display of two different consecutive sizes, thus providing a true digital display with respect to the overriding foot length size as well as to the overriding foot width size.

It is evident that the angles of the triangular members and the spacings of the contacts on boards 50 and 82 are closely interrelated for providing the correct progression of shoe sizes and for providing the correct dependency between width sizes and length sizes according to the standardized progression in the shoe sizing system adopted by shoe manufacturers in the United States. Unfortunately, as is well known to those skilled in the art, "lasts" used by shoe manufacturers are different from a manufacturer to another though assigned the same size number. Consequently, a shoe sizing instrument according to the invention as hereinbefore illustrated and described would be adequate for measuring foot sizes according to a given manufacturer, but could generally not be used, without a conversion table, for measuring foot sizes according to another manufacturer. Generally, the progression from size to size is the same from manufacturer to manufacturer, but the shoes of same size numbers and letters may show considerable differences in length and width.

Figure 10:
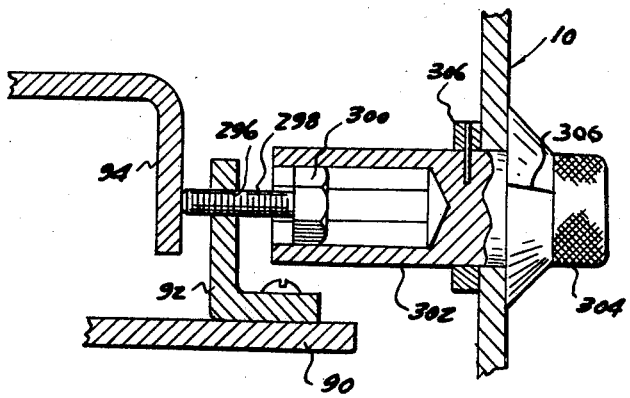

The arrangement of FIGS. 9 and 10 is provided for rendering the shoe sizing instrument of the invention of general use by providing adjustment means which may be programmed to compensate in differences in absolute size numbers and letters from shoe manufacturer to shoe manufacturer. As shown in FIG. 9, length size adjustment is provided by mounting board 56 supporting stationary spring wiper contact 54 upon the left hand of rails 44 and 46 by sliding frictional arrangement instead of mounting the board in a stationary position upon the left hand end of the rail members. This sliding frictional mounting is done by providing elongated mounting apertures such as 280 in board 56, and by fastening the board to the rail members by means such as screws 282 engaged through the elongated apertures 280 and threading in an appropriate threaded hole 283 in each rail member. Between the head of each screw 282 and the upper surface of board 56 is disposed a resilient washer member 284, so that when the screw 282 is driven into the rail member, the lower surface of board 56 is caused to frictionally engage the upper surface of the rail members and be normally maintained in a precise position as a result of the pressure caused by the spring washers 284. Board 56 is provided with a longitudinal bore 286 in which is engaged the threaded end portion 288 of a rod member 290 projecting through the side wall of the instrument housing 10. A knob 292 is mounted on the outer end of rod member 290 and a washer member 294 is pinned to the rod member on the interior of the housing. Consequently, by rotating knob 292, board 56 is caused to be displaced longitudinally, toward the right or the left, as seen in the drawing, according to the direction of rotation of knob 292. Knob 292 preferably has an index line 295 adapted to register with index or code indicia engraved on an annular scale, not shown, disposed around the knob, so as to enable an operator to preset or program the instrument of the invention so as to compensate for differences between shoe sizing standards from one manufacturer to another, by manually setting the transverse position of board 56.

FIG. 10 represents an example of an arrangement providing an adjustment of the width indicating portion of an instrument according to the invention. Angled abutment plate 92 mounted proximate the right end of slidable board 90 supporting width wiper contacts 86, FIG. 3, is provided with a threaded bore 296 in which engages the threaded end portion 298 of a threaded member having, for example, a square or hexagonal enlarged head 300. A square or hexagonal sleeve 302 is disposed in sliding engagement around the enlarged square or hexagonal head 300 of the threaded member and has an end passing through an appropriate aperture in the right side wall of the instrument housing 10. On the end of the sleeve projecting on the outside of the instrument is mounted an adjusting knob 304, having an index line 306, and the sleeve is prevented from longitudinal displacement by having a washer 306 pinned on the sleeve 302 proximate the inner surface of the instrument housing side wall. In this manner, by rotating knob 304 such that its index line 306 registers with the appropriate manufacturer standard marking on an annular scale, not shown, surrounding the knob, threaded member 298 is caused to project more or less on the left side of angled abutment 92 so as to cause an initial position to be occupied by board 90 which corresponds to a predetermined width size standard according to the given manufacturer. A similar arrangement is provided for the assembly consisting of angled abutment 118 and bar member 116 of FIG. 3, such an arrangement not being illustrated herein as it would be somewhat repetitious of FIG. 10. It is evident that the adjustment of the threaded member cooperating with angled abutment 92 should correspond to the adjustment of the threaded member cooperating with angled abutment 118, and in practice, sleeve 302 may be arranged with a toothed member disposed around its periphery, not shown, adapted to engage a tooth member around a sleeve similar to sleeve 302 and engaging and driving a square or hexagonal head of a threaded member cooperating with angled abutment 118. The threaded member cooperating with angled abutment 118 has a threaded of a lead equal to the lead of threaded member 298, but in opposite direction, so that for a predetermined angular rotation of knob 304, both threaded members will be advanced the same distance toward the left or the right, according to the direction of rotation of the knob, on the condition that the gear ratio between the toothed members be a ratio of one to one.

Although the absolute size numbers may vary for the same dimension of shoes from one manufacturer to another, the shoe size progression very seldom varies from one manufacturer to another. However, in order to compensate for such variations of progression, triangular members 58 to 64 of FIG. 3 may be mounted interchangeably with other triangular members having different angles, or alternately, the triangular members may be mounted on slide member 48 in such a manner as to be differentially rotatable around an axis perpendicular to their plane so as to permit variations in the angular positions of their hypothenuse sides.

An instrument according to the invention can be used by a customer in a self-serve store, and, by mounting the instrument in such a manner that board 14, FIG. 1, may be presented in a horizontal plane by proper orientation of the instrument housing, as well as in the angled position shown in FIG. 1, foot sizes may be determined while a person is standing up as well as while a person is sitting. In this manner, the amount of deflection of a person's foot arches can be determined, and proper shoe sizes may be obtained without or with arch supports.

It is readily apparent that the herein description and attached drawings have been given only for the illustrative purpose of describing a typical example of a foot measuring device according to the principles of the present invention. It is obvious that many additions, modifications and omissions will readily appear to those skilled in the art.

What is claimed as new is:

1. A foot measuring device comprising a stationary heel engaging plate and a plurality of dimension gaging elements mounted upon a base for manual longitudinal and transverse translation into engagement with a foot comprising a width gaging element, a pair of length gaging elements, one of which is a toe engaging over-all foot length measuring element and the other of which is a ball engaging arch length measuring element, a slide member mechanically translated by at least one of said length gaging elements, first circuit establishing contacts mounted on said slide member, fixed contact wiper cooperating with said circuit establishing contacts, length size numeral visual indicia individually connected to each of said first circuit establishing contacts, second circuit establishing contacts mounted on said slide member, width size visual indicia individually connected to each of said second circuit establishing contacts, movable contact wiper cooperating with said second circuit establishing contact and mechanically displaceable by said width gaging element, a source of electric power connectable to any one of said length size visual indicia and to any one of said width size visual indicia by means of said circuit establishing contacts, and overriding means adapted to mechanically translate the slide member according to the displacement of the more significant of said length gaging elements, said overriding means comprising a pair of unequal right-angled substantially triangular members attached to said slide member with the smaller right-angled side of each triangular member aligned along an axis parallel to the axis of translation of said slide member and means operatively connected to said length gaging elements for action upon the hypothenuse sides of said triangular members for translating said slide member, the arch length measuring element being adapted to cooperate with the smaller one of said triangular members and said substantially triangular members having each an absolute size and being so scaled relatively to the other as to provide conversion to an appropriate shoe length size displayed by said visual indicia as a result of the translation of said slide member by way of said operative action of either one of said over-all foot length measuring element and arch length measuring element.

2. The foot measuring device of claim 1 wherein both feet of a person are measured and further comprising overriding means for providing a visual display of the length size of the longer foot and of the width size of the wider foot corresponding to said displayed length size.

3. The foot measuring device of claim 2 wherein said visual display of the length size of the longer foot is obtained by connection of the appropriate numerical visual indicium to a source of electric power through the appropriate first circuit establishing contact mounted on said slide member, said slide member being displaced to a given position by any one of said length gaging elements positioned the furthest from said stationary heel engaging plate.

4. The foot measuring device of claim 3 wherein said visual display of the width size of the widest foot is obtained by individual mechanical linkage between each said width gaging element and said movable contact wiper, the overall displacement of said movable contact wiper resulting from the displacement of the width gaging element further away from the corresponding ball engaging length gaging element.

5. The foot measuring device of claim 4 wherein the displacement of one width gaging element is transferred to said movable contact wiper by a pair of symmetrically disposed substantially parallel toothed racks, a free running gear wheel being disposed therebetween in meshing engagement with the teeth of both said racks.

6. The foot measuring device of claim 3 wherein said first circuit establishing contacts and said second circuit establishing contacts comprise contacts alternately staggered and overlapping disposed in two parallel rows, discretely spaced relay actuating contacts electrically connected to a relay adapted to alternately connect a source of electrical power to the contacts in one row and to the contacts in the other row.

7. The foot measuring device of claim 6 wherein said first circuit establishing contacts further comprise a row of discretely spaced half size indicating contacts connected to a half size visual indicium, a row of discretely spaced half size relay contacts electrically connected to a relay switch adapted to turn on and off said half size visual indicium.

8. The foot measuring device of claim 7 further comprising manual setup means for programming said device for the shoe size standard of a predetermined shoe manufacturer.

9. The foot measuring device of claim 8 wherein said manual setup means comprises first adjustment means mechanically interconnected with said fixed contact wiper for adjustably originally positioning said fixed contact wiper according to the shoe length sizing system of a predetermined shoe manufacturer and second adjustment means mechanically interconnected with said movable contact wiper for adjustably originally positioning said movable contact wiper according to the shoe sizing system of said predetermined shoe manufacturer.

References Cited
UNITED STATES PATENTS

| | | |
|---|---|---|
| 2,021,218 | 11/1935 | Ballard. |
| 3,032,880 | 5/1962 | Shaw _____ 33—3.6 |
| 3,360,862 | 1/1968 | Darvin _____ 33—3.6 |

LEONARD FORMAN, Primary Examiner

DENNIS A. DEERING, Assistant Examiner